United States Patent [19]

Muramatsu

[11] Patent Number: 4,970,400

[45] Date of Patent: Nov. 13, 1990

[54] ILLUMINATED METER

[75] Inventor: Masahiro Muramatsu, Shizuoka, Japan

[73] Assignee: Yazaki Corporation, Japan

[21] Appl. No.: 465,595

[22] Filed: Jan. 19, 1990

Related U.S. Application Data

[63] Continuation of Ser. No. 251,447, Sep. 30, 1988, abandoned.

[30] Foreign Application Priority Data

Oct. 2, 1987 [JP] Japan .......................... 62-151361[U]
Oct. 2, 1987 [JP] Japan .......................... 62-151362[U]
Oct. 2, 1987 [JP] Japan .......................... 62-151372[U]

[51] Int. Cl.$^5$ ............................................. G01D 13/28
[52] U.S. Cl. ................................. 250/463.1; 116/288; 116/DIG. 36; 250/461.1
[58] Field of Search .................... 350/463.1, 461.1; 116/DIG. 36, 286, 287, 288

[56] References Cited

U.S. PATENT DOCUMENTS 2,761,056  8/1956  Lazo ........................ 362/26
4,057,730 11/1977  Dane ...................... 250/461.1
4,201,916  5/1980  Ellner ..................... 250/372

FOREIGN PATENT DOCUMENTS 653672  5/1951  United Kingdom ............ 250/463.1
774576  5/1957  United Kingdom ............ 250/463.1

Primary Examiner—Constantine Hannaher
Attorney, Agent, or Firm—Wigman & Cohen

[57] ABSTRACT

To uniformly illuminate a needle and a dial plate coated with fluorescent substance by ultraviolet rays, the illuminate meter comprises an ultraviolet ray emitting lamp and a meter cover coated with a film for reflecting only ultraviolet rays emitted from the lamp but transmitting visible light emitted from the fluorescent substance on the needle and the dial plate, thus improving the illuminate intensity and uniformity for providing better indication recognizability and reading accuracy. Further, it is preferable to dispose one or plural reflector plates between the dial plate and the meter cover.

3 Claims, 4 Drawing Sheets

FIG.1(A) (Prior Art)
FIG.1(B) (Prior Art)
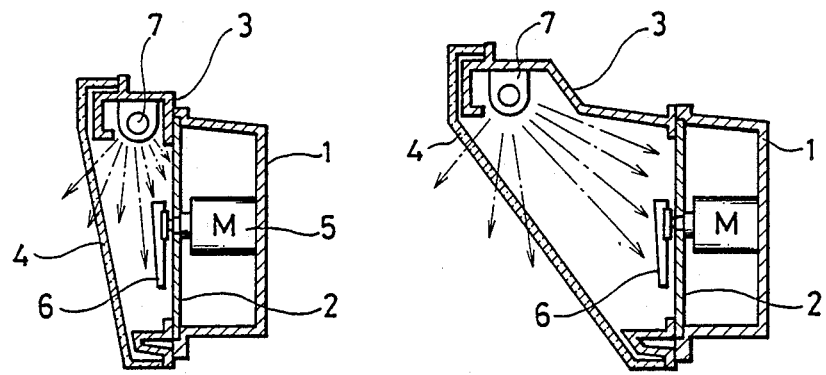
FIG.1(C) (Prior Art)
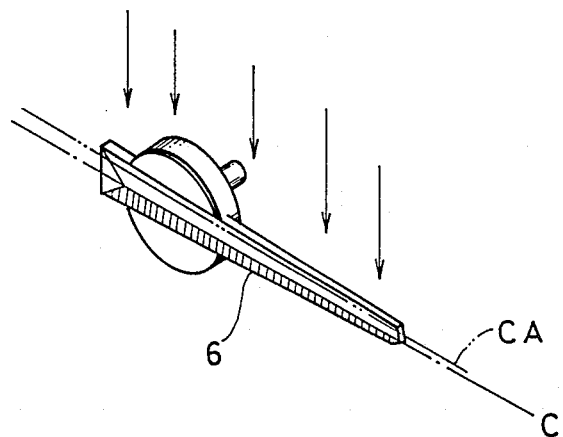

(Incident angle: 45°)

ILLUMINATED METER

This is a continuation of co-pending application Ser. No. 07/251,447 filed on Sept. 30, 1988, now abandoned.

BACKGROUND OF THE INVENTION

1. Field of the Invention

The present invention relates to an illuminated meter and more specifically to an improvement in indication recognizability and reading accuracy of illumination meter without increasing the dimensions and the cost thereof.

2. Description of the Prior Art

In an automotive vehicle, for instance, illuminated meters as shown in FIG. 1(A) are installed to indicate various information related to the vehicle. In FIG. 1(A), a prior-art illumination meter comprises a rear housing 1, a dial plate 2, a front housing 3 attached to the front outer periphery of the dial plate 2, a transparent meter cover 4, a movement body 5 fixed to the rear housing 1, an indicating needle 6 fixed to a needle shaft of the movement body 5, and an ultraviolet ray emitting lamp 7 for illuminating the needle 6 and various indication marks such as characters, numerals, graduation marks, etc. formed on the dial plate 2. The surface of the needle 6 is coated with fluorescent substance or paint including fluorescent substance. Further, the indication marks formed on the dial plate 2 are also coated with fluorescent substance or paint. Therefore, these needle 6 and indication marks are excited into luminescence, when excited by the ultraviolet rays, so as to emit visible light.

Further, in general the surface of the dial plate 2 is formed relatively dark so that the needle 6 and the marks can be seen clearly in contrast with the dark background or floated away from the dark dial plate 2.

In the prior-art illumination meter as shown in FIG. 1(A), since the ultraviolet ray emitting lamp 7 is disposed near the surface of the dial plate 2, there exists a problem in that the dial surface near the lamp 7 is bright but that remote from the lamp 7 is dark, thus resulting in a problem that the brightness is not uniform on the meter dial plate 2. In addition, since the surface of the needle 6 is formed into triangle shape in cross section and therefore there exist a bright side surface irradiated with ultraviolet rays and a dark side surface not irradiated therewith with the needle central line C as its border line, the operator erroneously sees the central line CA on the bright side surface as the needle center C as depicted in FIG. 1(C), so that it is difficult to accurately read a needle position relative to the dial plate 2.

To overcome the above-mentioned problems, an illumination meter as shown in FIG. 1(B) has been proposed, in which the ultraviolet ray emitting lamp 7 is disposed at a position a distance frontward away from the dial plate 2 in order to improve the uniformity of the illumination brightness.

In this prior-art illumination meter as shown in FIG. 1(B), however, there still exist other problems in that the illumination intensity on the dial plate 2 is decreased on the surface of the dial plate 2 and further the meter size becomes large. In addition, when the ultraviolet ray emitting lamp 7 is disposed remote from the dial plate 2, there exits another problem in that the indication marks are not well illuminated or shut out by the needle 6, so that the marks are not well illuminated.

Further, in the prior-art illumination meter, since the ultraviolet rays emitted from the lamp 7 are reflected from the dial plate 2 and transmitted through the transparent meter cover toward the driver or the operator, there exists a different problem in that the driver's cloths including decolorant give out light and therefore the driver's eyes become fatigued.

SUMMARY OF THE INVENTION

With these problems in mind, therefore, it is the primary object of the present invention to provide an illumination meter which can improve the indication recognizability and the reading accuracy without increasing the size and the manufacturing cost thereof.

To achieve the above-mentioned abject, an illumination meter of the present invention comprises: (a) a movement; (b) a needle driven by said movement to indicate meter readings, an outer surface of said needle being coated with a fluorescent substance for emitting visible light when excited by ultraviolet rays; (c) a dial plate formed with indication marks for indicating meter readings in cooperation with said needle, said indication marks being also coated with the fluorescent substance; (d) an ultraviolet ray emitting lamp, disposed at an outer periphery of said dial plate, for emitting ultraviolet rays to excite the fluorescent substance; and (e) a meter cover disposed in front of said dial plate and coated with a film for reflecting only ultraviolet rays emitted from said ultraviolet ray emitting lamp but transmitting visible light emitted from the fluorescent substance coated on said needle and the indication marks when excited by the ultraviolet rays.

Further, it is preferable to dispose first reflecting means near said ultraviolet ray emitting lamp, for reflecting ultraviolet rays toward the reflecting film coated on said meter cover, and/or second reflecting means on an opposite side remote from said ultraviolet ray emitting lamp, for reflecting ultraviolet rays toward the outer surface of the dial plate.

In the illumination meter of the present invention, since the surface of the transparent meter cover is coated with a film for reflecting only ultraviolet rays emitted from the lamp but transmitting visible light emitted from the fluorescent substance applied on the needle and the indication marks when excited by the ultraviolet rays, it is possible to more uniformly illuminate the needle and the indication marks by reflecting some part of ultraviolet rays, which would otherwise be transmitted toward the outside of the meter through the meter cover glass, toward the inside thereof, thus uniformly improving the indication recognizability all over the surface of the dial plate.

Further, since the needle can be illuminated uniformly from both the sides thereof, irrespective of the angular position of the needle, the needle reading error due to biased illumination can be eliminated, thus improving the reading accuracy.

Further, since the ultraviolet rays are prevented from being transmitted toward the outside through the meter cover, the illumination intensity can be increased, thus preventing fatigue of the driver's eyes.

BRIEF DESCRIPTION OF THE DRAWINGS

The features and advantages of the illumination meter according to the present invention over the prior-art illumination meter will be more clearly appreciated from the following description taken in conjunction with the accompanying drawings in which:

FIG. 1(A) is a cross-sectional view showing a first prior-art illumination meter;

FIG. 1(B) is a cross-sectional view showing a second prior-art illumination meter;

FIG. 1(C) is a perspective enlarged view showing a prior-art needle of the meter;

DETAILED DESCRIPTION OF THE PREFERRED EMBODIMENTS

Embodiments of the illumination meter according to the present invention will be described hereinbelow in detail with reference to the attached drawings.

Figure 2A:
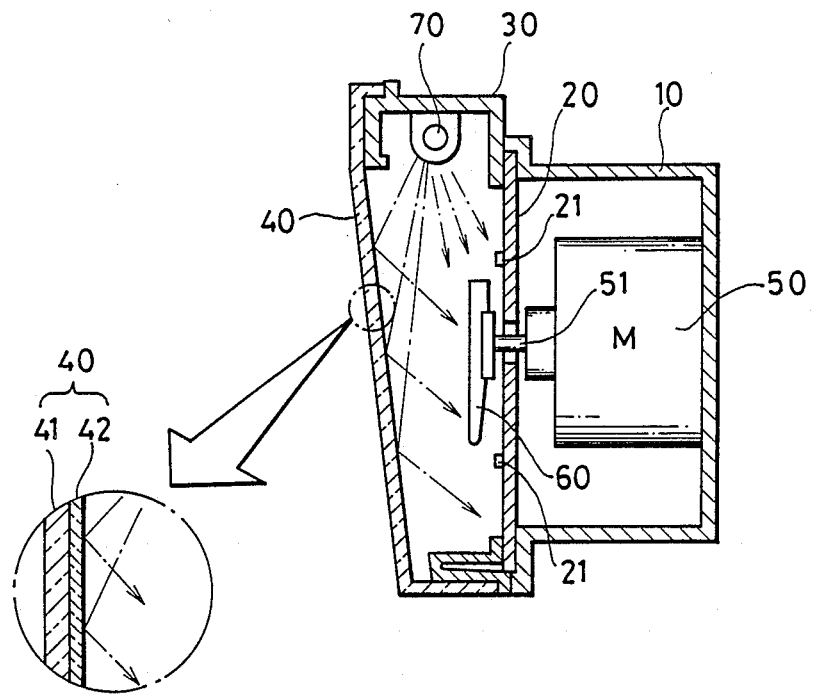
FIG. 2(A) is a cross-sectional view showing a first embodiment of the illumination meter according to the present invention.
Figure 2B:
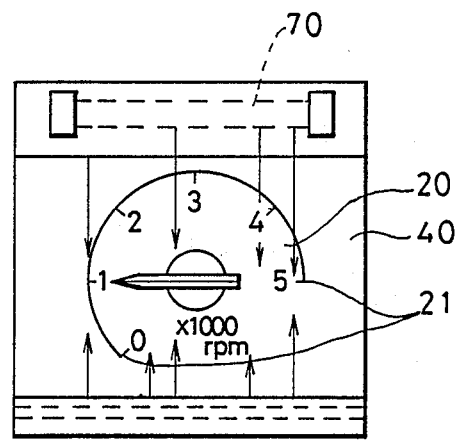
FIG. 2(B) is a front view showing the same illumination meter shown in FIG. 2(A)

In FIGS. 2(A) and (B), an illumination meter of the present invention comprises a rear housing 10, a dial plate 20 attached to the front side of the rear housing 10, a front housing 30 attached to the front outer periphery of the dial plate 20, a transparent meter cover (e.g. made of glass) 40 for covering the front housing 30, a movement body 50 fixed to the rear housing 10, an indication needle 60 fixed to a shaft 51 of the movement M, and an ultraviolet ray emitting lamp 70 for illuminating the needle 60 and various indication marks 21 such as characters, numerals, graduation marks, etc. formed on the dial plate 20.

The outer surface of the needle 60 is coated with fluorescent substance or paint including fluorescent substance. The dial plate 20 is colored by a dark color and the various indication marks 21 are coated with fluorescent substance or paint including the fluorescent substance. Therefore, when illuminated by the ultraviolet rays emitted from the ultraviolet ray emitting lamp 70, the needle 60 and the indication marks 21 are excited so as to emit visible light. The ultraviolet ray emitting lamp 70 is disposed on the upper inner peripheral surface of the front housing 30 so as to obliquely irradiate the outer surface of the dial plate 20 and the inner surface of the meter cover 40 with the ultraviolet rays emitted from the lamp 70.

The first feature of the illumination meter according to the present invention is to coat the inner surface of a glass plate 41 of the meter cover 40 with a film 42 which can selectively reflect rays with specific wavelengths corresponding to the ultraviolet ray but transmit rays with wavelengths corresponding to the visible light.

This transparent reflecting film 42 is a metallic film formed on the cover glass 41 by means of vacuum deposition technique or sputtering technique, etc. This film 42 reflects only ultraviolet rays, without changing the refraction index of the cover glass 41. It is preferable to form this transparent reflecting film 42 on the inner surface of the cover glass 41. However, it is also possible to form this film 42 on the outer surface of the cover glass 41 or both inner and outer surfaces of the cover glass 41.

Figure 6:
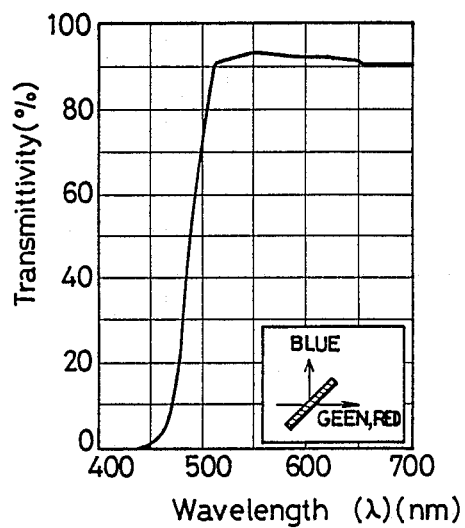
FIG. 6 is spectral transmittivity characteristics of the film coated on the surface of the meter cover.

This transparent reflecting film 42 is a dielectric multifilm formed by combining a plurality of films having different refraction indices, which is called Dichromic Mirror (Trademark) and made by VACUUM OPTICS CORPORATION OF JAPAN. The spectral transmittivity characteristics of this film are shown in FIG. 6. In FIG. 6, light having wavelengths shorter than 400 nm is perfectly reflected from the film but that higher than 500 nm is almost perfectly transmitted through the film.

Therefore, in the illumination meter of the present invention, some ultraviolet rays emitted by the ultraviolet ray emitting lamp 70 as shown by arrows in FIG. 2(A) directly travel toward the needle 60 and the indication marks 21 formed on the dial plate 20 to excite the fluorescent substance applied thereon to emit visible light. Further, some ultraviolet rays travel to the meter cover 40 and then reflect from the reflecting film 42 toward the fluorescent substance applied onto the needle 60 and the indication marks 21 located away from the lamp 70.

Here, since light radiated from the fluorescent substance is of visible rays, the light is transmitted through the meter cover 40 to the driver's eyes without being reflected from the reflecting film 42.

In the illumination meter of the present invention, in spite of the small-sized meter in which the ultraviolet ray emitting lamp 70 is disposed near the surface of the dial plate 20, the presence of the transparent reflecting film 42 formed on the cover glass 41 allows the ultraviolet rays emitted from the lamp 70 to illuminate the positions remote from the lamp 70, so that it is possible to allow the needle 60 and the indication marks 21 to uniformly radiate visible light all over the dial plate 20, thus improving the indicator recognizability.

In addition, since the needle 60 is uniformly illuminated, without being subjected to the influence of the angular positions of the needle, and therefore the needle 60 uniformly radiates visible light therefrom, it is possible to improve the indication accuracy of the needle 60.

Figure 3:
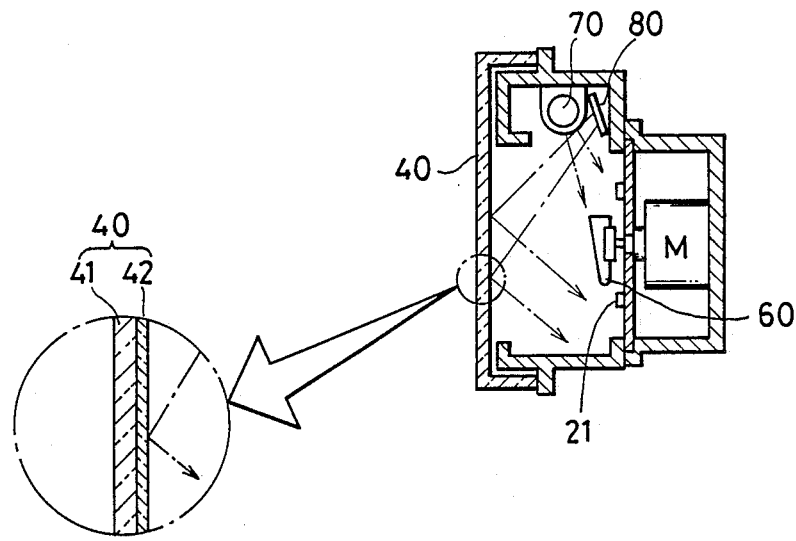
FIG. 3 is a cross-sectional view showing a second embodiment of the illumination meter according to the present invention.

FIG. 3 shows a second embodiment of the illumination meter according to the present invention, in which a first reflector plate 80 is further provided near the ultraviolet ray emitting lamp 70. This first reflector plate 80 is disposed at such an inclination angle that at least part of ultraviolet rays emitted from the lamp 70 is reflected to the inner surface of the meter cover 40 to illuminate indication marks remote from the lamp 70. Therefore, some ultraviolet rays emitted from the lamp 70 are first reflected by the first reflector plate 80 and further reflected by the reflecting film 42 toward the needle 60 and the indication marks 21 remote from the lamp 70.

Figure 4:
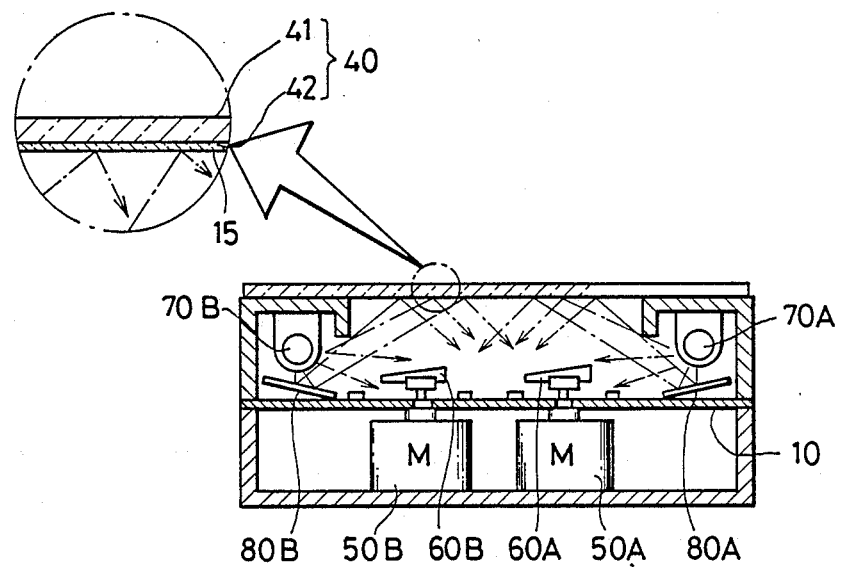
FIG. 4 is a cross-sectional view showing a third embodiment of the illumination meter according to the present invention.

FIG. 4 shows a third embodiment of the illumination meter according to the present invention, in which two movement bodies 50A and 50B are incorporated within a single rear meter housing 10. In this embodiment, since two needles 60A and 60B are arranged, two ultraviolet ray emitting lamps 70A and 70B and two reflector plates 80A and 8B are arranged on both the opposite side ends of the meter housing 10 in mirror symmetry with respect to the center of the illumination meter.

The structural features and functional effects of this third embodiment other than those described above are substantially the same as with the second embodiment previously described and therefore any detailed description of them is believed to be unnecessary.

Figure 5:
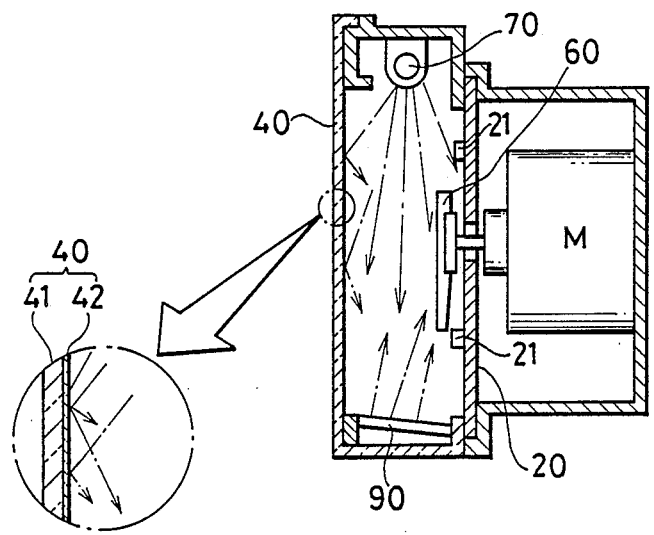
FIG. 5 is a cross-sectional view showing a fourth embodiment of the illumination meter according to the present invention.

FIG. 5 shows a fourth embodiment of the illumination meter according to the present invention, in which a second reflector plate 90 is further provided at such a position as to oppose the ultraviolet ray emitting lamp 70. This second reflector plate 90 is disposed at such an inclination angle that at least part of ultraviolet rays emitted from the lamp 70 is reflected to the surface of the dial plate 20 at a small incident angle, in order to more uniformly illuminate the needle 60 and the indication marks 21 from the opposite side remote from the lamp 70.

Therefore, some ultraviolet rays emitted from the lamp 70 and reflected from the reflecting film 42 are further reflected by this second reflector plate 90 toward the needle 60 and the indication marks 21 formed on the dial plate 20 to more uniformly illuminate the inside of the meter.

As described above, in the illumination meter according to the present invention, since the surface of the meter cover glass for covering the front surface of the meter is coated with a film which can reflect ultraviolet rays emitted from the ultraviolet ray emitting lamp but transmit visible light radiated from the fluorescent substance (applied on the needle and the indication markings) when excited by the ultraviolet rays, it is possible to more uniformly illuminate the needle and the indication marks by reflecting some part of ultraviolet rays (so far transmitted toward the outside through the cover glass) toward inside the meter, thus improving the indication recognizability all over the surface of the dial plate.

Further, since the needle can be illuminated uniformly from both the sides, it is possible to illuminate the central line of the needle upper surface uniformly irrespective of the angular position of the needle, thus eliminating reading error due to the needle illuminated under biased condition.

Further, since it is possible to prevent ultraviolet rays from being transmitted toward outside through the meter cover, it is possible to increase the illumination intensity within the meter, thus preventing fatigue of the driver's eyes.

In addition, when the first and second reflectors are further provided for the illumination meter, respectively or together, it is possible to further make uniform the illumination intensity within the meter, to improve the display recognizability and the reading accuracy, without increase the dimensions and the cost of the illuminated meter.

What is claimed is:

1. An illuminated meter for a vehicle comprising:
   (a) a movement;
   (b) a dial plate forming a portion of a housing for said meter, said dial plate being formed with indication marks indicating meter readings, said indication marks being coated with a fluorescent substance for emitting visible light when excited by ultraviolet rays;
   (c) a needle driven by said movement to indicate meter reading in cooperation with said indication marks of said dial plate, an outer surface of said needle also being coated with a fluorescent substance for emitting visible light when excited by ultraviolet rays, said coated outer surface describing a plane which is disposed forwardly of said dial plate with respect to the driver of said vehicle when said driver is in the driving position in said vehicle;
   (d) an ultraviolet ray emitting lamp, disposed at an outer periphery of said dial plate and within said housing, for emitting ultraviolet rays to excite the fluorescent substance; and
   (e) a meter cover disposed in front of said dial plate and forming a portion of said housing for said meter together with said dial plate, wherein said meter cover is coated with a film for reflecting only ultraviolet rays emitted from said ultraviolet ray emitting lamp but transmitting visible light emitted from the fluorescent substances coated on said needle on the indication markings when excited by the ultraviolet rays, whereby the ultraviolet light emitted within said housing is concentrated on said needle and said dial plate thus enhancing the visibility of said indicator marks on said dial and needle.

2. An illuminated meter for a vehicle comprising:
   (a) a movement;
   (b) a dial plat forming a portion of a housing for said meter, said dial plate being formed with indication marks for indicating meter readings, said indication marks being coated with a fluorescent substance for emitting visible light when excited by ultraviolet radiation;
   (c) a needle driven by said movement to indicate meter readings in cooperation with said indication marks of said dial plate, an outer surface of said needle also being coated with a fluorescent substance for emitting visible light when excited by ultraviolet rays, said coated outer surface describing at least two planes, each of said planes disposed forwardly of said dial plate with respect to the driver of said vehicle when said driver is in the driving position in said vehicle and disposed at an acute angle with respect to the horizon, with one of said acute angles upwardly disposed with respect to the horizon and the other of said acute angles downwardly disposed with respect to the horizon;
   (d) an ultraviolet ray emitting lamp, disposed at an outer periphery of said dial plate and within said housing, for emitting ultraviolet rays to excite the fluorescent substance; and
   (e) a meter cover disposed in front of said dial plate and forming a portion of said housing for a said meter together with said dial plate, wherein said meter cover is coated with a film for reflecting only ultraviolet rays emitted from said ultraviolet ray emitting lamp but transmitting visible light emitted from the fluorescent substance coated on said needle and the indication markings when excited by the ultraviolet rays, whereby the ultraviolet light emitted within said housing is concentrated on said needle thus enhancing the reading accuracy of said indicator marks on said needle.

3. The illuminated meter of claim 2 wherein said needle has a prismatic shape.

* * * * *

UNITED STATES PATENT AND TRADEMARK OFFICE
CERTIFICATE OF CORRECTION

PATENT NO. : 4,970,400

DATED : November 13, 1990

INVENTOR(S) : Masahiro MURAMATSU

It is certified that error appears in the above-identified patent and that said Letters Patent is hereby corrected as shown below:

Column 5, line 53:

Claim 1, line 5, after "marks" insert --for--;

Column 5, line 58:

Claim 1, line 10, "reading" should read --readings--;

Column 6, line 15:

Claim 1, line 29, "substances" should read --substance--;

Column 6, line 16:

Claim 1, line 30, "on" should read --and--;

Column 6, line 24:

Claim 2, line 3, "plat" should read --plate--;

Column 6, line 49:

Claim 2, line 28, delete second occurrence of "a".

Signed and Sealed this

Twenty-first Day of April, 1992

Attest:

HARRY F. MANBECK, JR.

Attesting Officer     Commissioner of Patents and Trademarks